(12) United States Patent
Buchholz et al.

(10) Patent No.: US 7,386,303 B2
(45) Date of Patent: Jun. 10, 2008

(54) MULTI-FUNCTION, MULTI-STATE INPUT CONTROL DEVICE

(75) Inventors: Dale R. Buchholz, Palatine, IL (US); Ira A. Gerson, Schaumburg, IL (US); Lea T. Adams, Barrington, IL (US)

(73) Assignee: Research In Motion Limited, Ontario (CA)

( * ) Notice: Subject to any disclaimer, the term of this patent is extended or adjusted under 35 U.S.C. 154(b) by 88 days.

(21) Appl. No.: 09/861,353

(22) Filed: May 18, 2001

(65) Prior Publication Data

US 2002/0173299 A1     Nov. 21, 2002

(51) Int. Cl.
*H04M 3/00* (2006.01)
(52) U.S. Cl. .............. 455/418; 455/419; 455/566; 455/73; 455/550.1; 455/412.1; 370/310
(58) Field of Classification Search ............ 455/418, 455/419, 420, 566, 73, 550.1, 412.1, 412; 370/310
See application file for complete search history.

(56) References Cited

U.S. PATENT DOCUMENTS

| | | | | |
|---|---|---|---|---|
| 4,002,983 | A | * | 1/1977 | Kavalir et al. ............ 455/521 |
| 5,326,270 | A | * | 7/1994 | Ostby et al. ............... 434/362 |
| 5,491,745 | A | * | 2/1996 | Roeder ................. 379/355.09 |
| 5,548,634 | A | | 8/1996 | Gahang et al. |
| 5,854,977 | A | * | 12/1998 | Oksanen et al. ............ 455/417 |
| 5,909,670 | A | | 6/1999 | Trader et al. |
| 5,953,656 | A | * | 9/1999 | Bertocci ................... 455/412 |
| 6,035,217 | A | * | 3/2000 | Kravitz .................... 455/561 |
| 6,112,064 | A | * | 8/2000 | Arrowsmith et al. ..... 455/186.1 |
| 6,125,287 | A | | 9/2000 | Cushman et al. |
| 6,161,026 | A | | 12/2000 | Uchida |
| 6,212,412 | B1 | | 4/2001 | Rogers et al. |
| 6,445,927 | B1 | * | 9/2002 | King et al. ................ 455/456 |
| 6,505,056 | B1 | * | 1/2003 | Liou ........................ 455/566 |

OTHER PUBLICATIONS

PCT International Search Report, Int'l Appl. No. PCT/US02/15945, Sep. 26, 2002 (3 pages).
Supplementary European Search Report, European Patent Office, Appl. No. 02737013.9, Oct. 18, 2005 (6 pages).

* cited by examiner

*Primary Examiner*—Nghi H. Ly
(74) *Attorney, Agent, or Firm*—Allen, Dyer, Doppelt, Milbrath & Gilchrist, P.A.

(57) ABSTRACT

In a two-way radio communications system wherein subscriber units are provided with multiple features from the software running on a server, a user interface of the subscriber unit permits the subscriber unit user to change the control state of the server software depending on different types of actuations of the user interface. In the preferred embodiment, one, two or more "clicks" on a momentary input switch, as well as pushing and holding and releasing the input switch can be used to select or de-select between multiple services and applications provided to the subscriber unit by the server software.

6 Claims, 6 Drawing Sheets

ACTION TABLE FOR PROCESSING A BUTTON EVENT WHILE IN AN APPLICATION OR SERVICE

| | | BUTTON EVENTS SENT TO APPLICATION OR SERVICE | | | |
|---|---|---|---|---|---|
| | | SINGLE CLICK | DOUBLE CLICK | PUSH-AND-HOLD | RELEASE |
| APPLICATION OR SERVICE CURRENTLY RUNNING | MAIN MENU | SEND MAIN MENU, PROMPT OR AUDICON TO SUBSCRIBER | SEND MAIN MENU, PROMPT OR AUDICON TO SUBSCRIBER | SEND MAIN MENU, PROMPT OR AUDICON TO SUBSCRIBER | SEND MAIN MENU, PROMPT OR AUDICON TO SUBSCRIBER |
| | APPLICATION OR SERVICE | SEND APPLICATION MENU, PROMPT OR AUDICON TO SUBSCRIBER | EXIT TO MAIN MENU | IGNORE OR SEND PROMPT, AUDICON OR ERROR MESSAGE | IGNORE OR SEND PROMPT, AUDICON OR ERROR MESSAGE |
| | CHAT APPLICATION | SEND APPLICATION MENU, PROMPT OR AUDICON TO SUBSCRIBER | EXIT TO MAIN MENU | IGNORE OR SEND PROMPT, AUDICON OR ERROR MESSAGE | IGNORE OR SEND PROMPT, AUDICON OR ERROR MESSAGE |
| | CHAT SERVICE | EXIT TO CHAT APPLICATION | EXIT TO MAIN MENU | COLLECT AND ROUTE INCOMING SPEECH | STOP COLLECTING AND ROUTING SPEECH |

Fig. 6

MULTI-FUNCTION, MULTI-STATE INPUT CONTROL DEVICE

BACKGROUND OF THE INVENTION

Portable communication devices such as cellular telephones, pagers and two-way radios are now able to provide a plethora of services and applications in addition to the basic communication function that they were nominally intended to have. For instance, cellular telephones, the original purpose and function of which was to make telephone calls, now provide wireless access to web pages on the Internet. Third party service providers allow e-mail messages to be received by and read using a cell phone. Pagers, which originally provided only the ability to be summoned, now can provide services that include continuous stock market quotes, professional sports games data as well as the ability to generate a response to a paging message.

The services and applications that have been added to the now-ubiquitous wireless communications devices mandate increasingly more capable, yet easier-to-use human-to-device interfaces by which the ever-increasing feature sets are made more easily accessible to the user.

SUMMARY OF THE INVENTION

There is provided a user interface method and apparatus that is single input device that provides multiple input function selection. By toggling a momentary input device once, twice, three times or more, or simply holding the input device "down" or closed, different services and applications are accessed by a user via a communications device. The selected functionality is provided to the device by a server or base station to which the subscriber device is loosely coupled by way of a two-way radio link.

BRIEF DESCRIPTION OF THE DRAWINGS

FIG. 3 is a simplified representation of a state diagram showing the various different services and applications states that a server of the system of FIG. 1 can be capable of existing in.

FIG. 6 is an action table for the communications system of FIG. 1 wherein different actions of the system are undertaken upon different input device actuations.

DETAILED DESCRIPTION OF A PREFERRED EMBODIMENT

Figure 1:
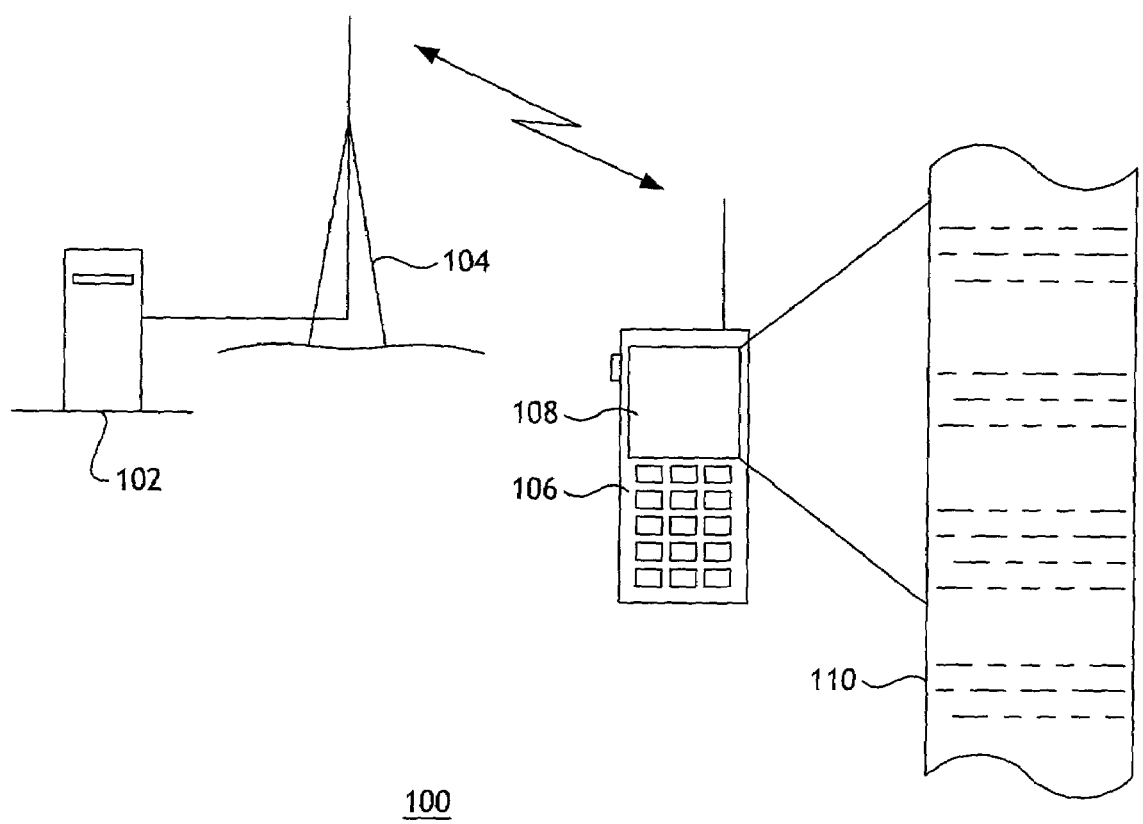
FIG. 1 is a simplified representation of a two-way radio communication system including a subscriber unit and the base station/server that provides access to various services and applications.

FIG. 1 shows a simplified block diagram of a wireless communication system 100. A server 102, is typically embodied as a computer or computer network in combination with one or more radio transmitters and receivers (not shown for purposes of clarity but well known and understood by those skilled in the art). The server and its radio receiver and transmitter is coupled to an antenna 104 for purposes of illustrating that the server 102 is loosely coupled to a subscriber unit by virtue of it being in two-way radio communication with one or more other radio communication devices 106 that are used by subscribers to the communication system. That the server is in radio communication with the subscriber units 106 is considered to be a loose coupling between the server 102 and the subscriber communication devices (or units) 106. The radio communications devices that are used by communication system subscribers are therefore referred to hereafter as a subscriber unit 106.

Subscriber units 106 for use with the communication system 100 include devices that allow data or audio or video to be wirelessly communicated. Subscriber unit 106 would include devices such as cellular telephones, pagers, two-way radios or a personal digital assistant (PDA) equipped with wireless communication capability by which information 110 (data, voice or video) can be presented (i.e., shown, viewed or played) on a user interface 108 such as a liquid crystal display commonly found on PDAs, pagers and cellular telephones but also including a cathode ray tube, or a speaker including one embedded in the subscriber unit or as part of an external headset or speakerphone As is now commonly known, the wireless communication system 100 such as that depicted in FIG. 1 preferably provides several different communication services or applications to a subscriber unit 106 user. Internet access, stock market activity and transactions, news, weather reports and messaging (paging) can be provided by way of data signals transferred between the server/base station 102 and the subscriber unit 106. In a multi-function subscriber unit 106, a user interface such as a liquid crystal display screen 108 provides a mechanism for viewing and selecting different information from different -services, such as informational, command and control, transactional and entertainment, that are provided to the subscriber unit 106 through the base station/server 102 and the signals it transmits. In addition, the user interface can include a speaker and a microphone to play out and receive audio in conjunction with or without the display mechanisms.

Figure 2:
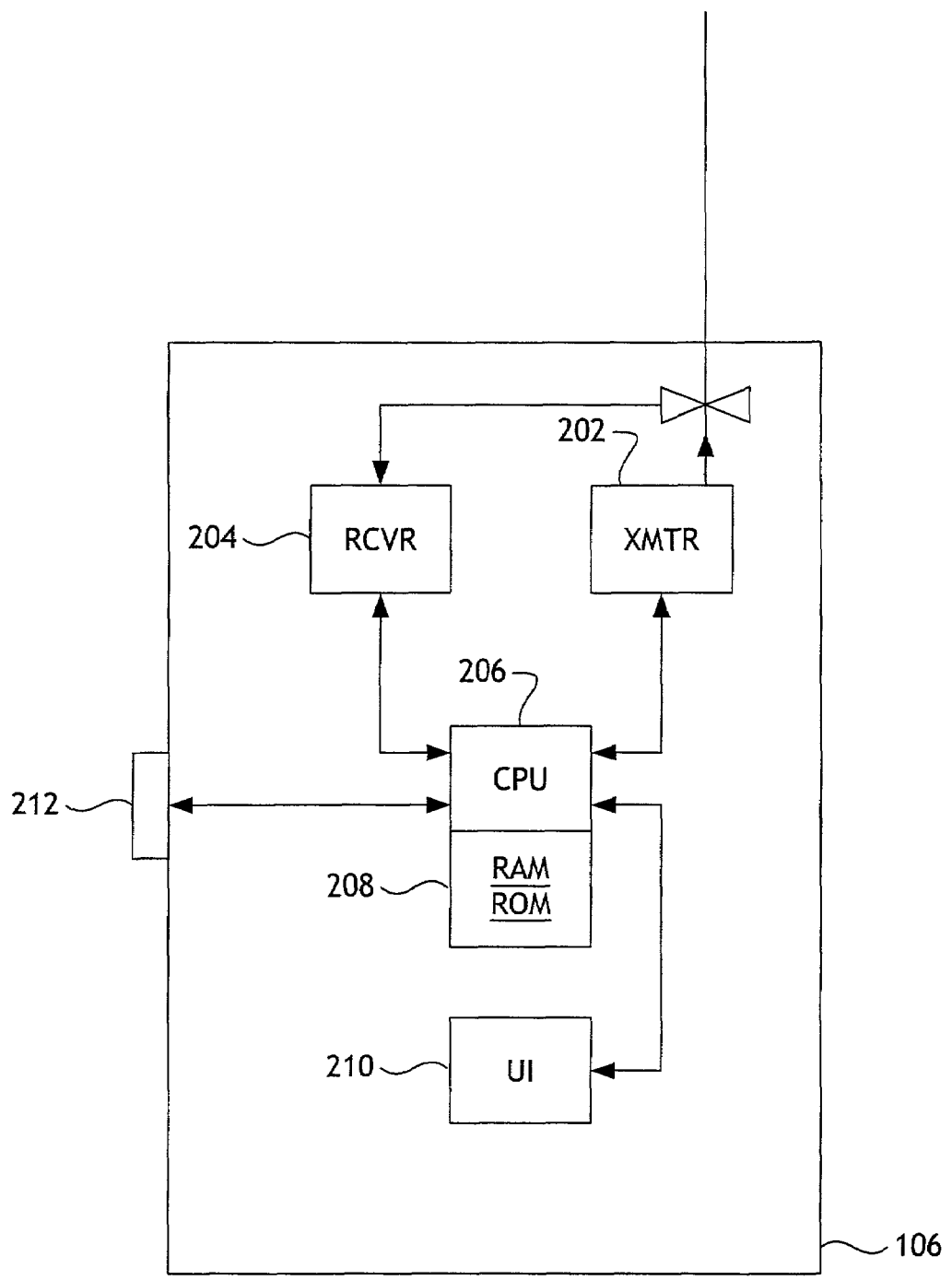
FIG. 2 is a simplified block diagram of a subscriber unit having an exemplar of a multi-function input user interface device.

FIG. 2 shows a simplified block diagram of a subscriber unit 106.

A radio transmitter 202 and a radio receiver 204, the structure and operation of which are known to those skilled in the art, enables the subscriber unit 106 to wirelessly communicate with the base station 102 by way of one-way or two-way radio frequency signals. By way of the communications capability of the base station (also referred to or known as a "server") 102, the communication system 100 (which includes the base station/server 102 and subscriber unit 106) can be operatively coupled to other communication systems such as the public switched telephone network (PSTN). In the case of a cellular telephone, two-way radio or two-way pager, both a transmitter and receiver are required to send and receive signals to and from the base station/server 102.

The receiver 204 and transmitter 202 are operatively coupled and responsive to a control processor 206, embodied as a microprocessor, microcontroller, field programmable gate array, digital signal processor with software (not shown) or functionally equivalent combinational and sequential logic devices. The processor (or processor complex comprised of several processors) 206, executes a computer program stored in the associated memory 208 and operates on data stored in memory 208 which can include both random access memory and read only memory as those skilled in the art will recognize. The functionality of the subscriber unit 106 is provided by the processor 206, its software and associated hardware components depicted in the figures.

A user interface 210 enables information to be obtained from and input to the subscriber unit 106. Examples of equivalent "user interfaces" for the subscriber unit 106 include a speaker and a liquid crystal display screen 108 for output as well as input devices such as push buttons, rocker buttons, a keypad, keyboard (not shown), touch-sensitive stylus-activated LCD screens and microphones. The user interface 210 in a subscriber unit enables the subscriber unit 106 "user" to use information and functionality provided by the server 102, such as the ability to send and receive telephone calls as well as view data or other information sent from the server 102. The user interacts with a service or application by listening to output audio from the speaker or reading text and graphics on the display and then controlling the flow of the service or application by entering information in response to the audible or visual prompts and information.

Inasmuch as the functionality of the subscriber unit 106 is provided through the server 102 and its software, in order to remotely control the functionality provided to the subscriber unit 106 by the server 102, the subscriber unit 106 needs to be able to communicate to the server 102, a subscriber unit user's desire to change the functionality of the subscriber unit that is provided to it, courtesy of the server 102.

Inasmuch as the server 102 provides different functionality by having different or multiple levels of control, signaling the subscriber unit's 106 request to change a feature or function requires an unambiguous signal from the subscriber unit 106 to the server that the subscriber unit user requires or desires a server functionality change. In order to keep a simplified user interface on the subscriber unit, i.e. simple and easy to operate controls, and yet keep the number of keys, switches and other input devices to a minimum, it is preferable to use a multi-function input user interface device or switch 212 on or connected to the subscriber unit 106 to signal functionality changes to the server. The input switch 212 signals a user's wish to change server 102 functionality by having the processor within the subscriber unit monitor the state of the input switch and objectively determine whether the switch has been operated once, twice, three or more times, or has been held closed. As such, software within the subscriber unit functions to recognize different types of actuations of the multi-function user interface input device 212 and, translate those different types of actuations into signals that can be transmitted to the server where the server software is designed to change the server functionality according to the user's perceived request. Hereinafter, the single actuation of the switch within a predetermined time period is referred to as a "single click." A double actuation within a predetermined time period is considered to be a "double click." A "push and hold" is considered to be a determination that a subscriber unit 106 user is holding the button down for transmission and a "release", subsequent to a "push and hold", signals the end of the transmission started by the "push and hold". Other devices that are considered to be equivalent to a momentary push button switch would include touch-sensitive screens, optical sensors, or other devices that can sense or indicate momentary electrical conditions (short circuits, resistances, capacitances or inductances).

The inventive concept is a user interface method and apparatus (preferably a momentary push-button switch) the particular different activations of which can be used to enable state changes in multiple-state control programs, depending upon the current state of the control program and the manner in which the input device is activated. In the preferred embodiment, software in the server 102 and in the subscriber unit 106 cooperate to enable a momentary push-button switch on the subscriber unit 106 to wake a suspended program; abort an executing program and launch a different program or immediately enable radio transmission.

Prior art computer mouse pointing devices commonly used on personal computers and the so-called stylus used with touch pads on PDAs do offer mechanisms for limited input control, i.e. selecting a particular one functionality, however, these prior art input devices and methodologies are not used to directly change the execution of an application program, i.e., abort an application program or to perform some other function, such as interrupting whatever the subscriber unit 106 might be doing and begin operating as a radio, without the use of additional user interface mechanisms, such as dialog boxes or selection lists.

By implementing a control program within the server 102 to be responsive to signals from the subscriber unit, that are indicative of different state changes of an input device within the subscriber unit 106, the control program operation within the server 102 can be directed (or changed) according to the state changes of the single input device in the subscriber unit 106.

In the preferred embodiment, the single input device is a momentary push-button input switch 212 on the subscriber unit 106. This switch 212 can be polled by the subscriber unit CPU (central processing unit) 206 or electrically coupled to a processor 206 interrupt request line (not shown) in order to have the CPU 206 monitor the state of the switch. The processor-detected operations of the input switch 212 are evaluated by the processor 206 software and determined by the processor 206 software to be either "single clicks", "double-clicks", "push-and-hold" or "release" actuations. A predetermined indicator message for each different actuation of the input switch 212 is transmitted from the subscriber unit 106 to the server 102 via a radio signal to cause the operation of one or more services or application control programs within the server 102 to change operation or state.

The server 102 hosts a collection of different applications programs and services. In many instances, the words application and service are used herein interchangeably. Examples of applications include, but are not limited to: email, weather reporting, stock monitoring and trading, voice dialing, chat and web browsing. Examples of services include, but are not limited to: telephone directory lookup (white and yellow pages), Internet search engines, geographic location technology, communication protocols, speech recognition and text-to-speech conversion.

In general, services provide pieces of information to an application, which combines two or more pieces of information together in order to satisfy a larger request or goal. In the preferred embodiment, the applications and services are: a Main Menu of the applications and services available in the system, Voice Dialing, Horoscope, a Chat Application and a Chat Service.

The following is a list of typical steps the subscriber unit 106 user will go through in using the communication system shown and described herein:
1. launch the subscriber unit 106 client computer program,
2. receive from the server 102, the Main Menu of applications and services supported by the server 102 through the subscriber unit 106, 3. repeatedly, for a number of times:
    a. choose an application or service offered or provided by the server 102,
    b. use the application or service for a period of time,
    c. re-access the Main Menu of applications and services,
4. shut down the subscriber unit 106 client computer program.

The subscriber unit 106 client program is launched (i.e., executed or run) either automatically when the subscriber unit 106 is powered on or by selecting the client software and manually starting it's execution according to the user interface paradigm of the subscriber device. For example, an icon can be selected on the Start Menu of a subscriber device 106, or the client software can be chosen from a list of subscriber applications, or a short-cut key can be pressed. Once this is done, the client software can present the Main Menu of applications and services available in the system, i.e., Voice Dialing, Horoscope and Chat. The client software shut down or termination is accomplished by exiting to a different subscriber unit 106 application or, by physically shutting the subscriber unit 106 off.

Figure 3:
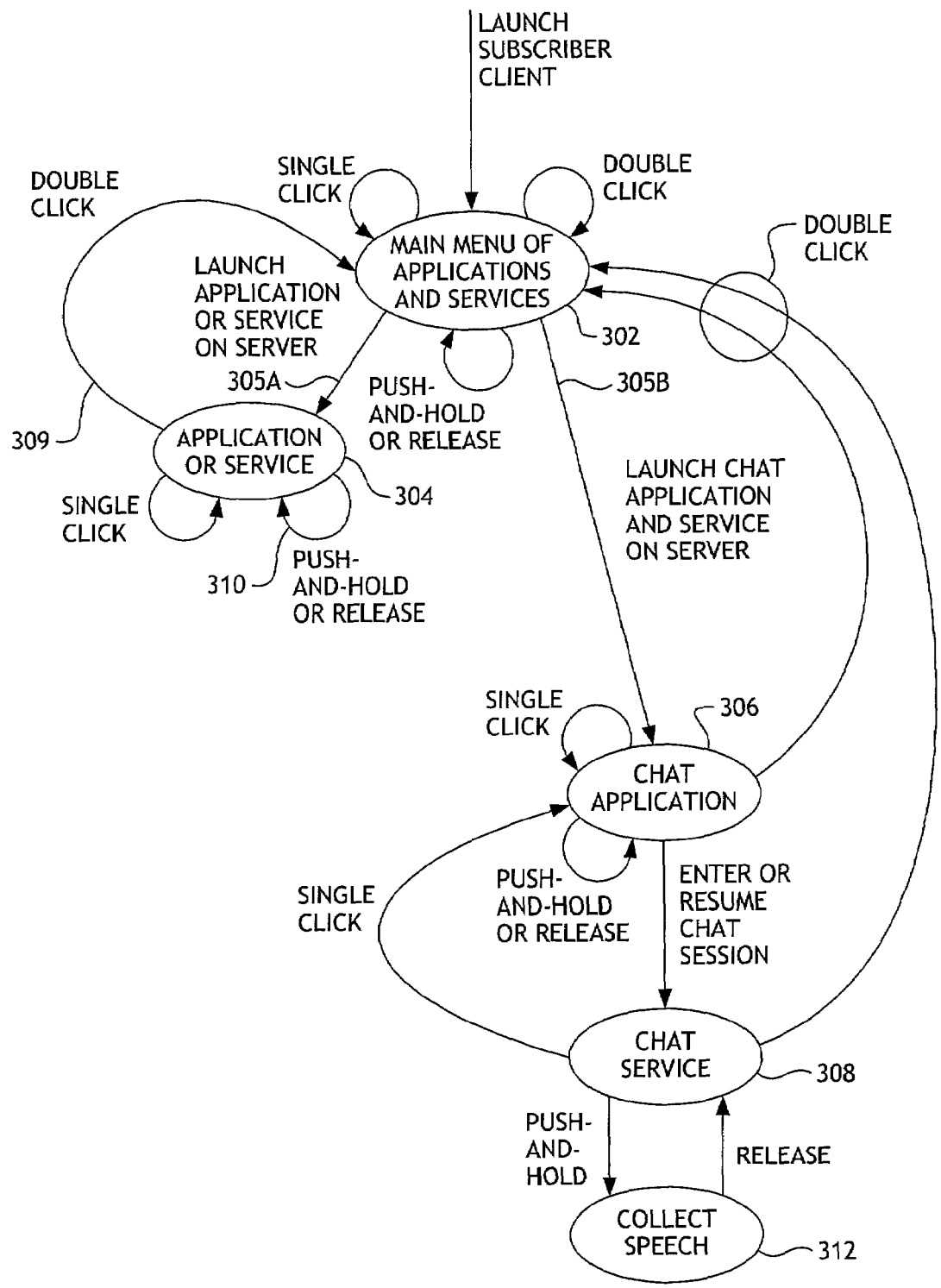

FIG. 3 is a diagram of the transitions between different server 102 applications and services based on the different input button actuations. At any instant in time, the server 106 is in (i.e., executing or running) one of the applications or services represented by: Main Menu of Applications and Services 302, Application or Service 304, Chat Application 306, and Chat Service 308. Depending upon the particular application or service program that the server is executing, the server will move between different applications and services (i.e., stops, terminates or suspends the execution of one program and then immediately there after begins running a different program) when the user actuates the input switch 212 as a single click, double click or push and hold, or when the user launches an application or service by choosing it from the Main Menu presented on the subscriber unit 106.

Upon activation of the subscriber unit's 106 client software, the server 102 is in the Main Menu 302 program, which is considered to be the server functionality select state. That is, the various functions and capabilities are selectable from the Main Menu 302 program. FIG. 6 represents the different actions taken by the server 102 if actuation of the input switch 212 on the subscriber unit 106 is determined (using the methodology described below) to be a single click, double click, push and hold, or release.

If the subscriber unit 106 user performs a single click of the input device 212 while the server control program is executing the Main Menu of Applications 302, the Main Menu service routine of the server 102 sends (from FIG. 6) a prompt, audicon or the menu of applications and services to the subscriber unit 106. A user prompt can be sent if the subscriber unit 106 menu has already been sent to the subscriber unit 106 and the Main Menu service routine simply wants to prompt the subscriber unit 106 user to make a choice of which service or application should be run. An audicon (e.g., short audible tone) can be sent as an audible alert to acknowledge the input switch 212 actuation and to remind the user to select from the subscriber unit 106 menu of applications and services. The subscriber unit 106 menu of applications and services can be sent by the server 102 to the subscriber unit 106 as the default mode of operation. The choice of how the server 102 and subscriber unit 106 respond to Main Menu service requests is programmable via user preferences and may be different for each subscriber unit 106 user.

As can be seen in FIG. 3, if the user actuates the input switch 212 as a double click, push and hold, or release the server performs the same sequence of event responses (from FIG. 6). The Main Menu service 302 request response of the subscriber unit 106 is similarly programmable by the user via user preferences. The actuation of the input switch 212 does not cause a transition from the Main Menu service 302 to another application or service. Such a transition can only be caused by selecting and launching a service from the menu of applications and services presented by the Main Menu service 302 using an input device other than switch 212, or an input sequence other than a button input sequence which is allocated to demarcate another application or service such as 304 or 306

If while the Main Menu of Applications 302 is running, the subscriber unit 106 user selects and launches an application or service from the Main Menu, 305A or 305B by way of an input voice command, icon selection, keystroke input or other input to the subscriber unit 106, the server 102 terminates or suspends any existing application or service and moves to (i.e., begins or resumes executing) a different Application or Service 304 (for example, applications that enable Voice Dialing or a Horoscope application or any other service or functionality that can be programmed into the server) or Chat Application 306. The Application or Service state 304 is considered to be a server application or service execution state wherein various capabilities, functions or services are provided to the subscriber 106. In the case where the user has "selected" to run or use an application or service other than Chat, i.e., the server necessarily changes execution of an Application program or Service 304, whereby a single click results in a notification to the first application or service that causes the application or service to respond (from FIG. 6) with a prompt, audicon, or a menu of options. A prompt can be generated for the user if the user is waking up (i.e., starting, resuming or otherwise running) an application or service that was suspended (i.e. is idle). The prompt can be a question like "What would you like to do?", or it can be a simple message like "Voice dialing active." The audicon can be a specific audio pattern indicating to the user that a particular application or service is active. The menu of the application or service can be a list of services available. For example, the Voice Dialing application can have a menu of: Call by Name, Call by Number, Address Book and Directory. The user could then select from the set of services.

A double click actuation 309 while in Application or Service 304 causes the application or service 304 to exit (terminate or suspend) and program control returns to the Main Menu service (from FIG. 6) 302.

A push and hold or release actuation 310 while in Application or Service 304 causes the application or service (from FIG. 6) to either ignore the actuation or to send a prompt, audicon or message to the user. In the current embodiment, these push and hold actuations can be ignored because they have no meaning for the application or service 304. In other embodiments, these actuations can trigger other responses, such as starting and stopping respectively the recording of audio for use by an application such as email where the push and hold and release are used to capture a voice attachment to a message. A prompt, audicon or message can be sent to the user as an indication that the current actuation was invalid and that the user should try again.

In the case where the user selected (shown as selection line 305B) the Chat Application 306 from the Main Menu 302, the server control program execution changes to the Chat Application 306, which is a functionality whereby two or more users can participate in a group discussion. Similar to the Internet on-line chat rooms or instant messaging wherein the server's responses to a single click, double click, push and hold, or release actuation at the subscriber unit 106 are the same as the other applications and services as described above. The aforementioned difference between the chat application 306 and other applications 304 is that the Chat Application 306 allows the user to enter or resume a chat session 308. If the user chooses to enter or resume a chat session through interaction with the Chat Application menu, then the server control program execution changes to the Chat Service 308.

While in the Chat Service 308, a single click actuation causes (from FIG. 6) the server control program to move back to the Chat Application 306. This allows the user to end or suspend the current chat session and return to the Chat Application menu. A double click actuation causes (from FIG. 6) the Chat Service to be terminated and a return to the Main Menu 302. A push and hold actuation causes (from FIG. 6) the subscriber unit to collect speech from the user and transmit it to the server. The server then forwards the speech to the Chat Service, which routes it to the other participants in the chat session. Once the user releases the input switch 212 the release actuation causes the subscriber unit to send a release indication to the server and to stop collecting speech 312 from the user, and the Chat Service stops routing to the other participants.

Figure 4:
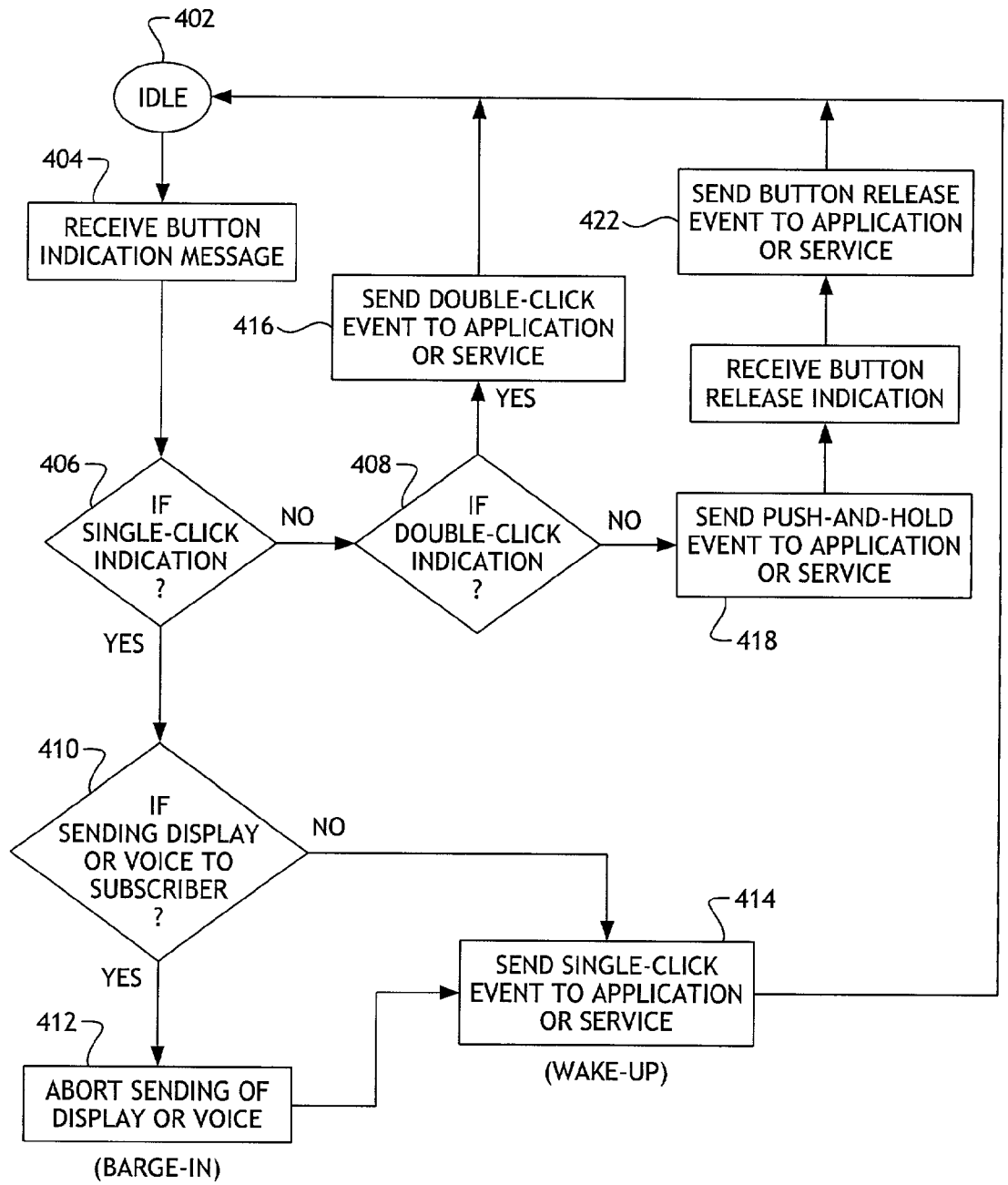
FIG. 4 is an exemplary flow chart depicting the operation of the server control program (for a server in a communication system shown in FIG. 1).

Enabling the server 102 functionality to transition from one state to another using a single input device at the subscriber is accomplished by having software within the server 102 and software within the subscriber unit or units 106 cooperate in monitoring the state transitions of the input device 212 on the subscriber unit 106. FIG. 4 shows a flow chart of the server 106 communications control program that enables the server 102 to select its functionality in response to the various actions of a single input device 212 on the subscriber unit 106.

When the server 102 communications control program is in an "idle" state (step 402), it waits for inputs or direction from external devices such as commands or messages indicating the actuation of one or more input buttons or switches on one or more subscriber units 106. Upon the actuation of one or other of the input devices (switch 212 on a subscriber unit 106, or perhaps an equal-functioned key on a keyboard or keypad), the subscriber unit 106 CPU 206 will format a message or signal (the particular structure or organization of which is a design choice), which is modulated on to a RF carrier in the transmitter 202 for broadcast to and reception, demodulation and detection by the server 102 and its associated radio equipment (not shown). Inasmuch as the subscriber 106 and the server 102 must communicate using agreed upon protocols, the message or signal sent by the subscriber unit 106 in response to an input switch 212 closure must generate a message that is understood as such by the server 102.

When the received button indication message from the subscriber 106 is received at the server in step 404, the server communications control program first checks if the button or switch actuation was a single click 406 or a double click in step 408. In the preferred embodiment, a "single click" message and a "double click" message from the subscriber unit 106 are separately recognizable messages. (The subscriber unit 106 determines whether the input device was operated as a single click, double click or push and hold or release. A message uniquely identifying the switch actuation is sent, unambiguously identifying the switch 212 actuation.) In other words, a "double click" message is preferably not the temporal concatenation of two, "single click" messages although such an alternate embodiment is certainly contemplated as an equivalent to two different messages.

If the received button actuation message 404 was determined to be a "single click" (or single actuation) in step 406, program control proceeds to step 410 whereat step the server communications control program determines if it is sending either displayed data or voice information to the subscriber unit 106. (Those skilled in the art will recognize that in a communications system 100, wherein several different subscriber units 106 can be serviced by a single server 102, that the incoming switch 212 closure messages also include data that identifies a particular subscriber unit 106 from which a switch closure message was sent. A subscriber unit 106 identifier can include a cellular telephone mobile and/or electronic identifier number, a radio serial number or other data that identifies the subscriber unit 106 to the server 102 in order to enable the individual subscriber units to have personalized data services provided to them.)

In step 412, upon the determination that data or voice was being sent to the subscriber unit 106, the server 102 communications control program aborts the data or voice transmission to the subscriber unit 106 and notifies the server application or service software in step 414 that a single click closure was received from the particular subscriber unit 106. The receipt of the single input device closure in step 414 will cause a server 102 application or service control program that is sending display data or voice information to the subscriber unit 106 to stop generating display data or audio information for the subscriber unit 106. The act of inputting while output is occurring is commonly referred to as barge-in. Terminating the output of the visual or audible information upon the start of input is commonly accepted practice in the industry. After notifying an application or service that a single click was received, the server 102 communications control program returns to the idle state 402.

In step 410, if there is no data or voice information being transmitted to the subscriber, server 102, in step 414 the single click event detection is sent to the application or service control program whereupon the server communications control program returns to its idle state in step 402. The net effect of the detection of a single input device actuation, if no data or voice or being sent, is a wake-up, i.e., the application or service was idle at the detection of the single click actuation and needs to interact with the user via the subscriber unit 106.

Returning to step 406, if a single click message from the subscriber unit 106 was not detected, the server communications control program determines in step 408 if the input message from the subscriber 106 was a "double click" message upon which at step 416, the server communications control program transfers that indication or detection to an application or service program that can be running at the time.

If the input device actuation message from the subscriber 106 was not a single click message as determined in step 406, nor was it a double actuation as detected in step 408, the server communications control program in step 418 assumes and determines that the subscriber unit 106 is in a so-called "push and hold state" during which input speech is recorded and transmitted to the chat service 308 running at the server 102. The "push and hold state" is relayed to the server communications control program to notify the chat service of the impending transmission of the collected speech. The chat service 308 receives the "push and hold" indication and awaits the collected speech or the button release indication from the subscriber unit 106.

Upon release of the input button in step 420, the input button release state at 422 is transferred to any running application whereupon the server 102 communications control program returns to the idle state 402.

Figure 5:
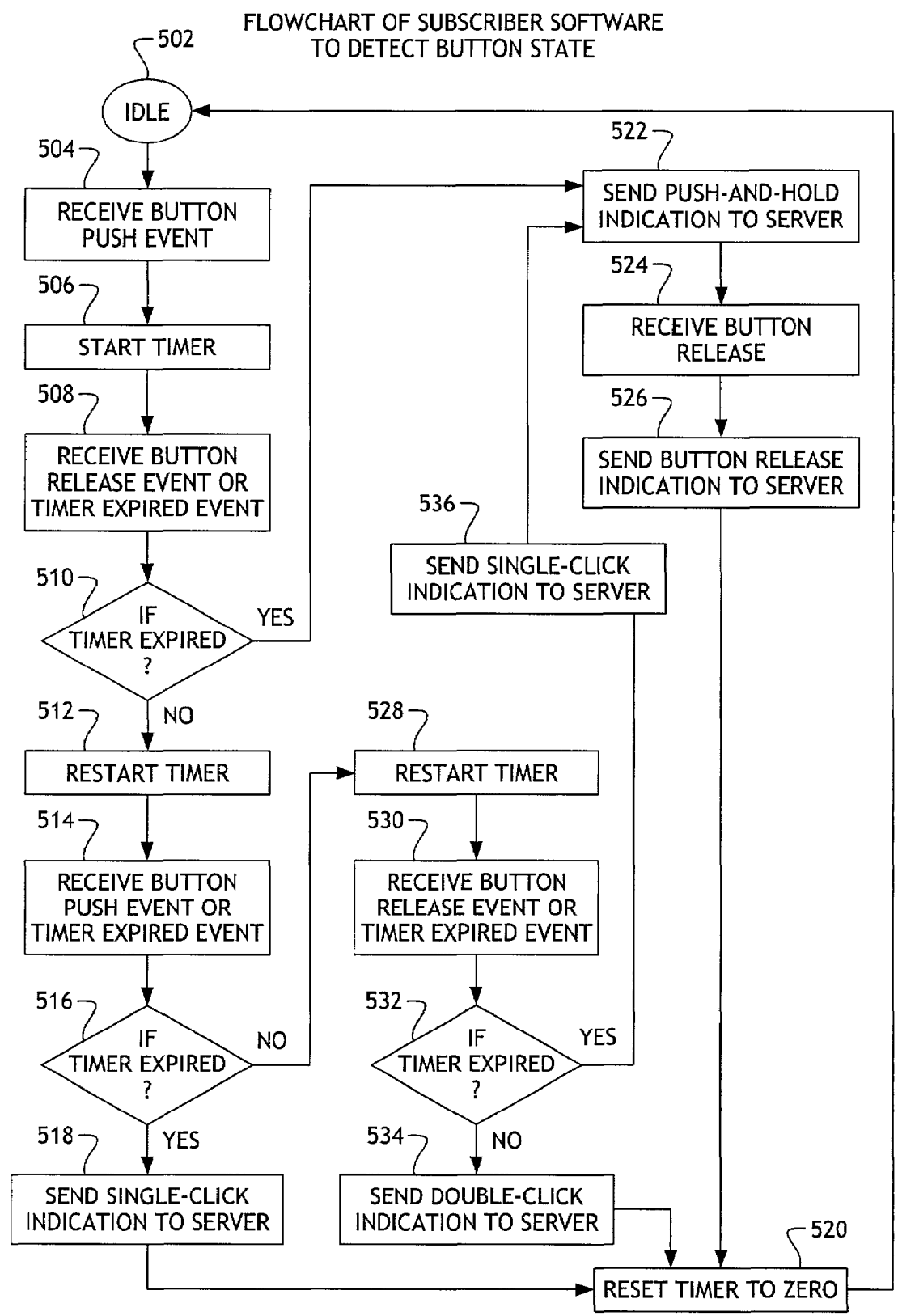
FIG. 5 shows the steps by which one, two, three, or four different input device actuations are detected within a subscriber unit.

FIG. 5 depicts a flow chart of the subscriber unit 106 functionality (i.e., software or programming) required to detect the state and actuation of the input device 212 of the subscriber unit 106.

From an idle state 502 a switch closure is detected by the subscriber unit 106 CPU 206 by way of a poll or perhaps a software or hardware interrupt to the CPU 206 indicating that the input device 212 has been activated (closed or opened) in step 504. (Any switch state detection routine executed by the CPU 206 would of course need to "debounce" the switch 212 closure, however, such implementation details are well-within the scope of knowledge of those skilled in the art and omitted here for simplicity.)

A timer is started in step 506 after detecting a switch closure (after debouncing) which continues to run until either the button release event occurs or the timer expires as shown in step 508. The amount of time that must expire in steps 506 and 508 is a design choice and should be chosen using human engineering considerations. The time during which the switch 212 must be closed so as to indicate a single click is somewhat subjective.

If the button release event is detected before the timer has expired, as shown in step 510, a second timer is started in step 512 to determine whether a subsequent button event occurs within the time period established (or set) in step 512. Like the time required of a "single click" the speed at which a user must actuate an input device so as to be considered a "double click" is a design choice. If the timer value set in step 512 expires before the second button event is detected in step 514, in step 516 the expiration of the timer value set in step 512 is considered to be indicative that the input device closure was a so-called "single click event" in step 518. The timer of 512 is reset to zero in step 520 with the subscriber unit 106 control program to detect button state returning to the idle state 502.

From the idle state 502, when an input button event is detected in step 504 and the timer is started in step 506, if the timer of step 506 expires before receipt of the button release event in step 508, such an event means that the button 212 has been held closed (or open in the case of a normally closed switch) and the server control program depicted in FIG. 5 considers the input device or input button activation to be a so-called "push and bold state" in step 522. The "push and hold state" is conveyed to other pertinent applications that can be running until the input device button is detected as being released in step 524. When that button release is detected, in 526 the server control software is notified, the timer value is reset to zero in step 520 and control flow returns to the idle state 502.

If the input device actuation in step 504 is detected and the timer is started, if the timer value of step 506 is not expired prior to the detection of the button release and if at step 516 a determination is made that the second button actuation occurred before the expiration of the second timer of step 512, a determination is made in step 516 that there can be a second input device actuation whereupon the input start timer is reset in step 528. If the timer value in step 528 is detected in step 530 and the timer value has not expired as determined by step 532 the control program determines that the input device was actuated twice or doubly clicked in step 534.

Any application running in the server is notified (by the server's receipt and detection of the appropriate message from the subscriber unit 106) that the subscriber unit 106 user has doubly clicked the input device, the input timer is reset to zero and program control returns to the idle state.

If after the input timer is reset in step 528 and that timer expires prior to the detection of a button release event, the user's actuation of the input device is considered to be a single actuation consisting of a single click followed by a push and hold. In step 536 a message indication for the single click is sent to the server followed by a message indication for the push and hold in step 522. While the preferred embodiment is to send two separate messages, those skilled in the art can appreciate that the messages can be combined into one message. In addition, an application receiving the single click and push and hold indications can interpret these in any manner appropriate for that application or service. For example, a single click and push and hold combination can be a signal to activate a voice memo or recording service.

In a communication system 100 having multi-function subscriber units, the functionality of which is provided by a multi-state control program of a server 102 for the system, a single, two-state (i.e. open or closed) input device can control the operation or entry of a multi-level control program if the predetermined sequential operations of that input device are agreed upon by the server 102 and the subscriber unit 106 to identify the different features that are to be accessed.

In FIG. 6, a table of the system processing of button events while the server is in an application or service is depicted. The various applications or services that a server can provide are indicated corresponding to the various input device actuation events that are detected by the subscriber unit 106 and conveyed to the server 102.

If a menu or list of available applications or services from the server is being presented to the user, the button events or input device events have no effect on the display in that the same menu or list is presented along with a prompt or audicon. If on the other hand the server is executing a software application or service, a single actuation of the input device will return program flow or program control to the application or service menu. The single actuation therefore provides the subscriber unit user with an ability to wakeup the application or service or barge-in in order to terminate output and input information or a request.

If the server is running an application or service and the input device of the subscriber unit is actuated twice or doubly, the current application or service is terminated and the subscriber unit is provided with a main menu from which various other applications or services are made available for selection.

As a user interface, a single momentary push-button switch can be used to effectively provide multiple levels of control if the control software within the communication system can detect one, two or more actuations. In the preferred embodiment, a single actuation of a momentary push-button switch can cause one functionality of a subscriber unit 106 to be changed to another. Actuating the input device twice, in close succession causes the subscriber unit 106 to assume yet another functionality. Similarly, altering the embodiments of the invention can contemplate actuating the input device multiple times in close succession indicating that other levels of functionality to be accessed. By pressing and holding the input device, the cellular telephone, two-way radio or other communications device can yet enter another mode of operation.

While the various modes described herein are those of the preferred embodiments, the scope of the invention is reflected in the appended claims hereto.

We claim:

1. A portable wireless subscriber unit operable in a communications system including a server for providing a plurality of predetermined services to the wireless subscriber unit, the wireless subscriber unit comprising:
   a display for displaying a menu listing the predetermined services;
   a first user input interface for selecting from the menu one of the predetermined services;
   means, responsive to the first user input interface, for transmitting a first message to the server by way of a radio link to cause a server application program to begin providing the selected one of the predetermined services to the wireless subscriber unit;
   a second user input interface comprising a single input device for generating an electrically detectable input signal from user actuation of the single input device;
   means, coupled to the second user input interface, for detecting predetermined types of user actuations of the single input device based on the electrically detectable input signal, the predetermined types of user actuations comprising a single click, a double click and a push-and-hold;
   means for generating a second message identifying one of the predetermined types of user actuations corresponding to the user actuation of the single input device;
   means, coupled and responsive to the generating means, for transmitting the second message to the server by way of the radio link, the second message for causing the server application program to execute one or more state changes during provisioning of the selected one of the predetermined services to the wireless subscriber unit.

2. The wireless subscriber unit of claim 1, wherein the server application program is a chat application program.

3. The wireless subscriber unit of claim 1, wherein the single input device includes a momentary-contact push-button switch.

4. A wireless communication system, comprising:
   a two-way radio network allowing wireless communication between a server and a wireless subscriber unit;
   the wireless subscriber unit wireless, including:
      a memory,
      an input switch for generating a output signal in response to user actuation of the input switch,
      a processor, operatively coupled to the input switch and memory, and
      a client application stored in the memory and executable by the processor,
         the client application including
            program mean for detecting predetermined types of user actuations of the input switch based on the output signal, the predetermined types of user actuations comprising a single click, a double click and a push-and-hold, and
            program means for generating a message identifying one of the predetermined types of user actuations detected in response to the user actuation of the single input device, and
      a radio transceiver, operatively coupled to the processor, for transmitting the message to the server; and
   the server including;
      a plurality of server application programs for providing a plurality of predetermined services to the wireless subscriber unit, and
      a communications control program for selectively sending a barge-in signal or an event signal indicating the detected type of user actuation to at least one of the server application programs in response to receiving the message.

5. The system of claim 4, wherein at least one of the server application programs is a chat application program.

6. The system of claim 4, wherein the input switch includes a momentary-contact push-button switch.

* * * * *